(12) United States Patent
Girondi et al.

(10) Patent No.: US 10,953,358 B2
(45) Date of Patent: Mar. 23, 2021

(54) FILTER GROUP OF AIR DIRECTED TO AN AIR ASPIRATION INTAKE OF AN INTERNAL COMBUSTION ENGINE

(71) Applicant: UFI FILTERS S.P.A., Porto Mantovano (IT)

(72) Inventors: Giorgio Girondi, Mantova (IT); Jörn Timm Kiener, Ludwigsburg (DE)

(73) Assignee: UFI FILTERS S.P.A., Porto Mantovano (IT)

(*) Notice: Subject to any disclaimer, the term of this patent is extended or adjusted under 35 U.S.C. 154(b) by 673 days.

(21) Appl. No.: 15/533,720

(22) PCT Filed: Dec. 7, 2015

(86) PCT No.: PCT/IB2015/002332
§ 371 (c)(1),
(2) Date: Jun. 7, 2017

(87) PCT Pub. No.: WO2016/092362
PCT Pub. Date: Jun. 16, 2016

(65) Prior Publication Data
US 2017/0319998 A1 Nov. 9, 2017

(30) Foreign Application Priority Data
Dec. 10, 2014 (IT) .................... RE2014A000101

(51) Int. Cl.
*B01D 46/00* (2006.01)
*B01D 46/42* (2006.01)
(Continued)

(52) U.S. Cl.
CPC ......... *B01D 46/0005* (2013.01); *B01D 29/15* (2013.01); *B01D 46/001* (2013.01);
(Continued)

(58) Field of Classification Search
None
See application file for complete search history.

(56) References Cited

U.S. PATENT DOCUMENTS 4,909,937 A * 3/1990 Hoffmann ............ B01D 29/54
210/315
6,159,259 A * 12/2000 Maeda ............ B01D 46/0004
55/323

(Continued)

FOREIGN PATENT DOCUMENTS

DE 202007006769 U1 9/2008
DE 102008039213 A1 9/2009
(Continued)

*Primary Examiner* — Bobby Ramdhanie
*Assistant Examiner* — Brit E. Anbacht
(74) *Attorney, Agent, or Firm* — Volpe Koenig (57) ABSTRACT

An air filter group for air supply to internal combustion engines of motor vehicles, of a type comprising an external casing provided with an inlet opening of the air to be filtered, and an outlet opening of the filtered air, and a removable cover, the inlet and outlet openings being separated by a removable filter cartridge which comprises a hollow cylindrical filter wall crossed by the air in a centripetal direction, in which the at least a filter cartridge is fixed to the cover in which cover a chamber is present, delimited by a base provided with at least a hole at which the at least a cartridge is fixed, by an opposite wall to the base and by an annular wall located between the base and the opposite wall and comprising the outlet hole of the filtered air, the cover being destined to be inserted sealedly in the casing.

17 Claims, 8 Drawing Sheets

(51) Int. Cl.
  *B01D 46/24* (2006.01)
  *B01D 29/15* (2006.01)
  *F02M 35/02* (2006.01)
  *F02M 35/024* (2006.01)

(52) U.S. Cl.
  CPC ....... *B01D 46/008* (2013.01); *B01D 46/2407* (2013.01); *B01D 46/2414* (2013.01); *B01D 46/4227* (2013.01); *F02M 35/0209* (2013.01); *F02M 35/02416* (2013.01); *B01D 2265/06* (2013.01); *B01D 2279/60* (2013.01)

(56) References Cited

U.S. PATENT DOCUMENTS

| | | | | |
|---|---|---|---|---|
| 6,368,388 | B1* | 4/2002 | Kosmider | B01D 46/0004 55/490 |
| 10,441,913 | B2* | 10/2019 | Billiet | B01D 53/0415 |
| 2005/0120687 | A1* | 6/2005 | Casey | B01D 45/04 55/423 |
| 2007/0084785 | A1* | 4/2007 | Schuster | B01D 46/46 210/435 |
| 2007/0209341 | A1* | 9/2007 | Pearson | B01D 46/0045 55/418 |
| 2007/0271884 | A1* | 11/2007 | Pearson | B01D 46/0031 55/410 |
| 2007/0271885 | A1* | 11/2007 | Rieger | B01D 46/0005 55/482 |
| 2008/0168903 | A1* | 7/2008 | Lane | B01D 46/2414 96/152 |
| 2008/0276583 | A1 | 11/2008 | Munkel | |
| 2010/0058723 | A1* | 3/2010 | Feisthauer | B01D 46/0005 55/418 |
| 2010/0058930 | A1* | 3/2010 | Schuster | B01D 46/0004 96/421 |
| 2010/0263344 | A1* | 10/2010 | Haynam | B01D 46/0005 55/493 |
| 2010/0275862 | A1* | 11/2010 | Cassell, Jr. | F02M 35/161 123/41.57 |
| 2011/0296999 | A1* | 12/2011 | Foerster | B01D 46/0039 96/419 |
| 2014/0230384 | A1* | 8/2014 | Girondi | B01D 46/002 55/419 |
| 2015/0128546 | A1* | 5/2015 | Walker | B01D 46/0004 55/502 |
| 2015/0176544 | A1* | 6/2015 | Kaufmann | F02M 35/02416 55/425 |
| 2016/0108866 | A1* | 4/2016 | Dewit | F02M 35/02483 55/385.3 |
| 2017/0184062 | A1* | 6/2017 | Bursch | F02M 35/0205 |
| 2017/0292418 | A1* | 10/2017 | Thalmann | B01D 35/30 |
| 2017/0319998 | A1* | 11/2017 | Girondi | F02M 35/0209 |
| 2018/0328244 | A1* | 11/2018 | Ardes | B01D 35/147 |
| 2018/0339254 | A1* | 11/2018 | Kaufmann | B01D 46/0005 |
| 2018/0361298 | A1* | 12/2018 | Girondi | B01D 46/2411 |
| 2018/0363598 | A1* | 12/2018 | Ruhland | B01D 46/0004 |
| 2019/0037923 | A1* | 2/2019 | Shenkal | B01D 46/0038 |
| 2019/0308124 | A1* | 10/2019 | Neef | B01D 46/0005 |

FOREIGN PATENT DOCUMENTS

| | | |
|---|---|---|
| DE | 102008036913 B3 | 11/2009 |
| DE | 102013002729 A1 | 8/2014 |
| WO | 2012143793 A1 | 10/2012 |
| WO | 2013129998 A1 | 9/2013 |

\* cited by examiner

FILTER GROUP OF AIR DIRECTED TO AN AIR ASPIRATION INTAKE OF AN INTERNAL COMBUSTION ENGINE

TECHNICAL FIELD

The present invention relates to a filter group of air directed to an air intake of an internal combustion engine.

In greater detail, the present invention relates to a filter group which is associated to an internal combustion engine, and which is destined to be located in the engine compartment of the vehicle on which the engine is installed.

PRIOR ART

In order for internal combustion engines to function, both Diesel and petrol engines, the cylinders must be supplied with a certain quantity of air collected from the surrounding environment, to as to supply the oxygen necessary for combustion of the fuel.

The air is usually collected by one or more air intakes which open on the vehicle bodywork, is conveyed towards an aspiration manifold, which communicates directly with the cylinders of the engine through the aspiration valves.

As is known, the air collected from the environment can cause suspension of solid particles having dimensions sufficiently large as to serious damage the engine, should the particles reach the inside of the engine.

In order to prevent this from happening, between the air intake and the aspiration manifold an air filter group is located, which is for treatment of the above-mentioned solid particles.

The filter groups of known type usually comprise a supply conduit which connects the air intakes to the aspiration manifold, along which a filter box is located, generally of large dimensions, able to contain a filter wall made of porous material which retains the solid particles and allows the air part to pass.

During use, the filter wall blocks more or less rapidly, and therefore needs regular maintenance and periodic replacement.

For these reasons, the filter wall and the relative filter box must be located in an easily-accessible position of the engine compartment, and this constitutes a very considerable limitation to the distribution of the available spaces internally of the engine compartment, also in the light of the dimensions of the group itself.

An aim of the present invention is to obviate the above-mentioned drawback with a solution that is simple, rational and relatively inexpensive, at the same time providing an advantageous alternative with respect to the above-described prior-art systems.

These aims are attained by the characteristics of the invention as reported in the independent claims. The dependent claims delineate preferred and/or particularly advantageous aspects of the invention.

DESCRIPTION OF THE INVENTION

A first embodiment of the invention discloses a filter cartridge of air in supply to an internal combustion engine of motor vehicles, comprising a filter wall, characterised in that the filter wall is fixed to a support body which comprises a chamber limited by a base, provided with at least a perforated shank at which the at least a filter wall is fixed, and by an upper wall, opposite the base, between which a passage opening of the filtered air is defined.

In a different embodiment of the invention, an air filter group for supply of internal combustion engine of motor vehicles is disclosed, comprising an external casing, provided with an inlet conduit of the air to be filtered, and an outlet conduit of the filtered air, the inlet and outlet conduits being separated by at least a filter wall axially housed internally of the casing, characterised in that the casing comprises an opening occluded by a support body of the filter wall, the support body comprising a chamber delimited by a lower base, provided with at least a hole at which the at least a filter wall is fixed, and by an upper wall, opposite the base, between which an air passage opening is defined, in fluid communication with the air outlet conduit. In a further embodiment an air filter group is provided for supply to internal combustion engines, comprising an external casing, delimiting the outlet conduit of the filtered air and a housing flange connected to the casing and able to delimit an opening occluded by the support body of the filter wall; the support body comprises a chamber delimited by a lower base provided with at least a hole at which at least a filter wall is fixed and by an upper wall, opposite the base, between which an air passage opening is defined, in fluid communication with the outlet conduit. This configuration enables preventing use of the casing delimiting the dirty side of the filter wall, with a consequent advantageous exploiting of the internal spaces of the engine compartment and the filter surface of the tubular walls.

A further embodiment of the invention relates to an air filter group destined to be associated to a cooling radiator of an internal combustion engine, comprising an external casing provided with a distributor for conveying air to be filtered towards at least a housing seating of a filter cartridge, and a manifold able to convey the filtered air towards an outlet conduit, characterised in that the distributor comprises an air inlet opening located above an upper surface of the radiator.

BRIEF DESCRIPTION OF THE DRAWINGS

Further characteristics and advantages of the invention will emerge from a reading of the description that follows, provided by way of non-limiting example, with the aid of the figures of the accompanying tables.

BEST WAY OF CARRYING OUT THE INVENTION

With reference to figures from FIG. 1 to FIG. 6, in which a first embodiment of the invention is illustrated, an air filter group is illustrated of air in supply to internal combustion engines of motor vehicles, of a type comprising an external casing 2, provided with an inlet conduit 3 of the air to be filtered, and an outlet conduit 4 of the filtered air, both located on a lateral wall of the casing 2.

In detail, the casing 2 comprises a beaker body 20 on which the inlet conduit 3 of the air to be filtered is fashioned, which inlet conduit 3 is provided with an upper mouth 21 (FIG. 3) on which a cover 22 is fixed, provided with an outlet conduit 4 of the air.

In a variant of the invention, the beaker body 20 and the cover 22 might be monolithic.

It is specified that in a variant of the invention, not illustrated, the air inlet conduit might also be positioned on the bottom of the beaker body 20.

The casing 2 comprises an upper opening 5 (FIG. 5) which enables axial insertion of a filter cartridge 6 internally of the casing, which is provided with at least a filter wall 8. In greater detail, in the illustrated embodiment, the upper opening 5 is realized on an upper surface 24 (FIG. 5) of the cover 22.

In a variant of the invention, not illustrated, the air inlet conduit might be omitted. In this case the upper opening 5 would be realized on a housing flange connected to the outlet opening.

In the illustrated embodiment, the filter cartridge 6 comprises a support body 7 of two filter walls 8 having a cylindrical shape which are axially housed internally of the beaker body 20.

With particular reference to figures from 3 to 6, the support body 7 comprises a chamber 70 delimited by a base 71, provided with two perforated lower shanks 72, at which the filter walls 8 are fixed, and by an upper wall 73, opposite the base 71, between which an air passage opening 74 is defined, the passage opening 74 being in fluid communication with the outlet conduit 4 of the filtered air. The upper wall 73 is inclined with respect to the lower base 71, so that the chamber 70 exhibits growing sections in a direction towards the passage opening 74 of the filtered air. Further, at an upper surface 730 thereof, it exhibits (FIG. 2) a grasping handle 731 which enables easy inserting and extracting of the filter cartridge 6 to and from the casing 2.

The upper wall 73 might also be arranged parallel with respect to the base 70.

The chamber further exhibits, in this embodiment of the invention, a vertical perimeter wall 75 which connects the base 71 with the opposite upper wall 73, and is provided with openings 76 (FIG. 2), and on which the filtered air passage opening 74 is fashioned.

The body 7 is sealedly inserted in the passage opening 5 internally of the casing 2, and provided, for example, in particular in the cover 22. For this purpose it exhibits, at the base 71 and the opposite wall 73, respectively two annular seatings 77 and 78 (FIG. 5), each of which receives a complementary seal gasket 79, 80.

Further, fins 81 are positioned between the base 71 and the upper part 73 (FIG. 5), which fins 81 are shaped and configured such as to facilitate the air flow towards the passage opening 74.

The functioning of the invention is very simple; the air enters internally of the casing 2 through the inlet conduit 3, crosses the filter walls 8, from outside towards inside, and flows towards the outlet conduit 4 of the filtered air through the two shanks 72 and the chamber 70.

Figures from 8 to 12 illustrate a second embodiment of the invention which will be described in the following. It is specified that in the description of the second embodiment of the invention the same reference numerals will be used to indicate identical components already described in the preceding embodiments of the invention.

The figures illustrate an air filter group 100 destined to be directly associated to a cooling radiator 101 (FIG. 8) of an internal combustion engine (not illustrated).

The filter group 100 comprises an external casing 102 provided with a distributor 103 (FIGS. 8 and 10), configured so as to convey the air to be filtered towards at least a housing seating 104 of a filter cartridge, and which comprises at least an inlet opening 106 of the air located above an upper surface of the radiator 101.

In greater detail (FIG. 11) the distributor 103 is step-conformed and comprises a first portion 103a, provided with the air inlet mouth 106, which develops in the direction of a horizontal axis A of symmetry of the casing 102, and a second portion 103b, perpendicular to the first portion 103a, which second portion 103b develops in a direction of a vertical axis of symmetry B of the casing 102, and is destined to be located at a rear vertical surface of the radiator 101.

Figure 11:
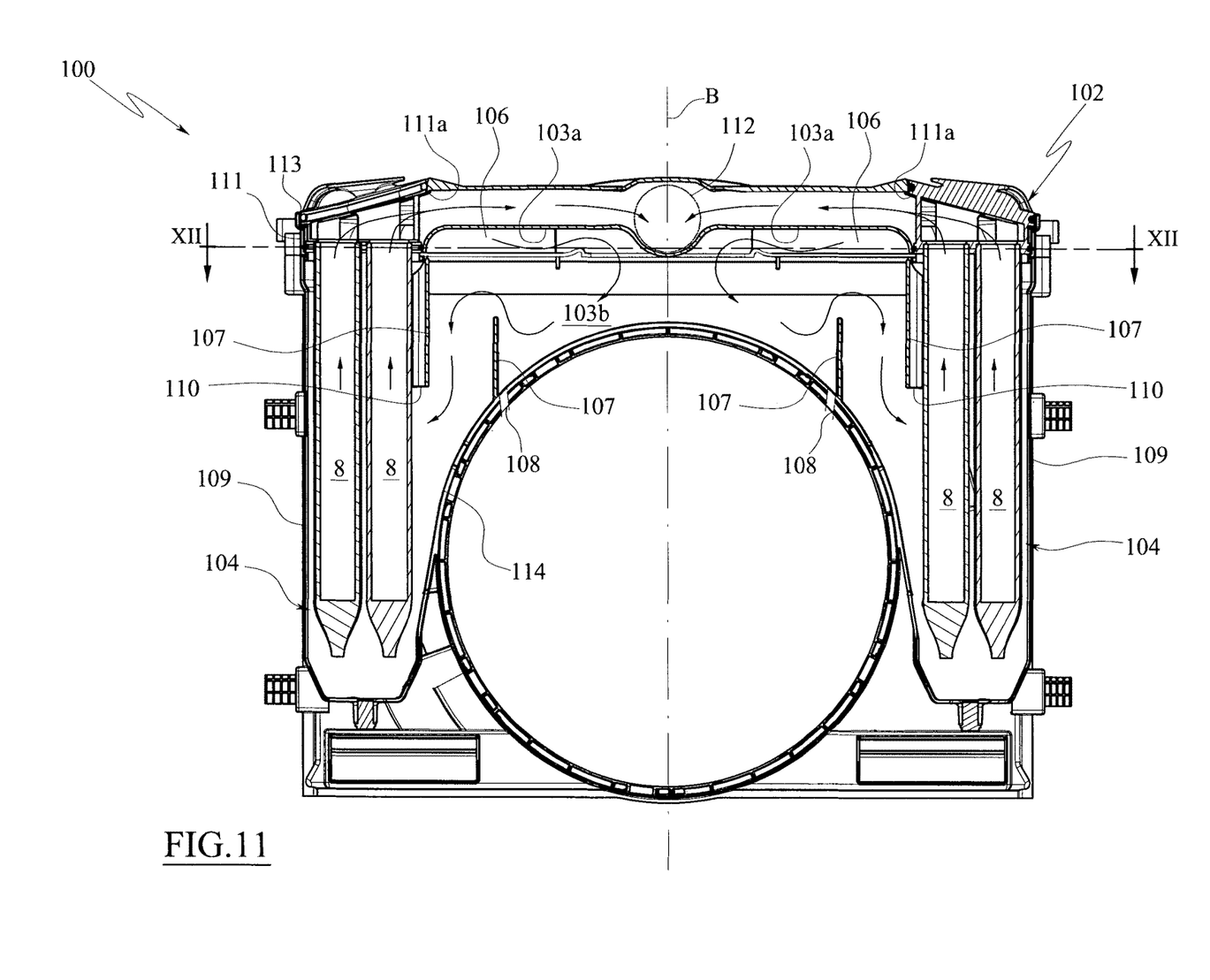
FIG. 11 is section XI-XI of FIG. 10.
Figure 12:
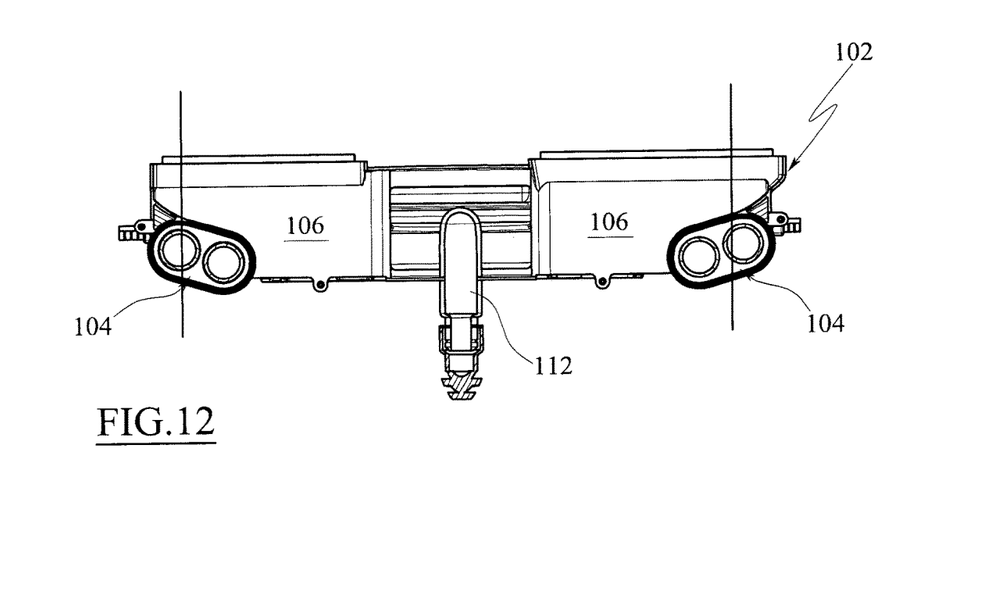
FIG. 12 section XII-XII of FIG. 11.

The second portion 103b houses a plurality of vertical walls 107 (FIG. 11) which have the function of switching the air flow which flows through the distributor 103 for separating any water particles present in the air. The separated water particles are discharged to outside the casing 102 thanks to a plurality of passage holes 108 present on a lower perimeter edge of the casing 102 (FIG. 11).

In the illustrated embodiment, the distributor 103 comprises two inlet openings 106 of the air that are symmetrical with respect to a vertical plane of symmetry which contains the vertical axis of symmetry B of the casing 102 and is perpendicular to the radiator 101.

As mentioned in the foregoing, the casing 102 also comprises at least a housing seating 104 of a filter cartridge. In the embodiment illustrated in the figures the casing 102 comprise two identical housing seatings 104, each of which houses a filter cartridge, which are symmetrical with respect to the vertical plane of symmetry, which contains the vertical axis of symmetry B of the casing 102, and is perpendicular to the radiator 101. In greater detail the seatings 104 are located at two opposite ends of the casing 102, and each thereof is in fluid communication with the second portion 103b of the distributor 103.

In this embodiment of the invention, each seating 104 comprises a beaker-shaped portion 109, substantially identical to the beaker body described in the first embodiment of the invention, on which a slit 110 is afforded for passage of the air to be filtered. The beaker portion 109 (FIG. 11) is provided with an upper mouth on which a cover 111 (FIG. 10) is fixed, provided with an outlet portion 111a of the filtered air in communication with a manifold 105 configured for conveying the filtered air towards an outlet conduit 112.

It is specified that the cover 111, the horizontal portion 103a of the distributor 103 and the manifold 105 can be realised as a single monolithic body.

Figure 10:
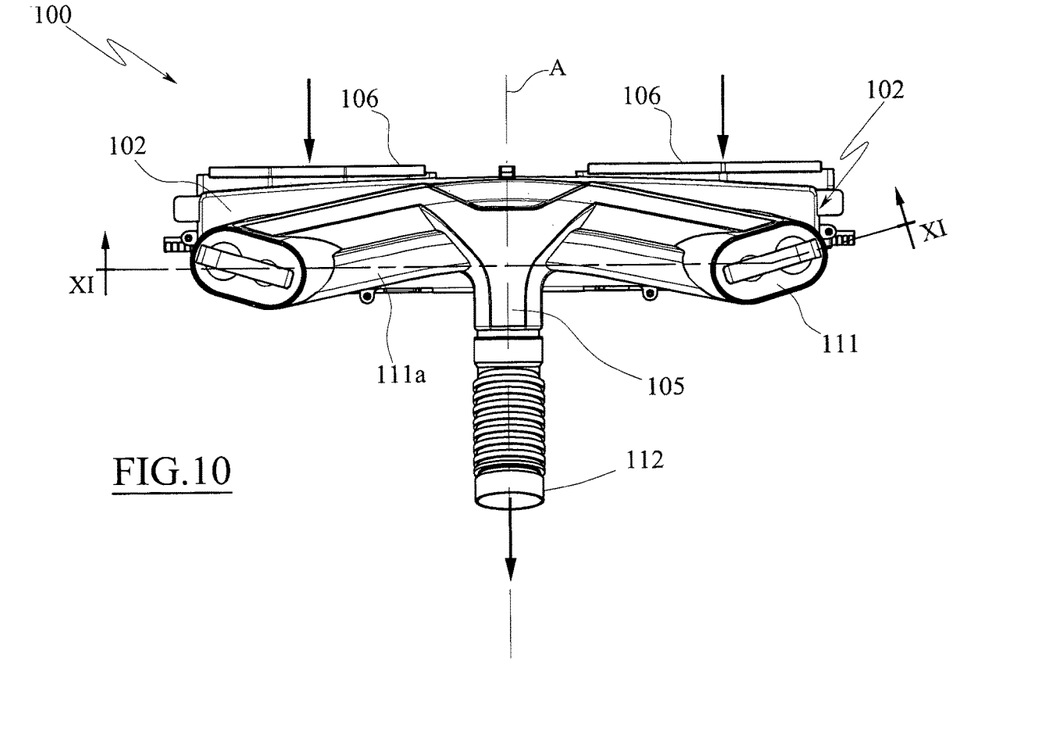
FIG. 10 is a view from above of FIG. 8.

The casing 2 further comprises at least an upper opening 113 which enables axial insertion of the filter cartridge 6 internally of the casing and which, in accordance with the present embodiment, is realised in the cover 111 (FIG. 10).

In this embodiment of the invention, the filter cartridge, which is housed in the respective housing seating 104, is further identical to the filter cartridge 6 described previously, for which reason a detailed description of the filter cartridge will be omitted.

The manifold 105 is located above the distributor 103 and is in fluid communication with the outlet portions 111a (FIG. 11) of the filtered air. The manifold 105 also comprises the discharge conduit 112, which, in the present embodiment of the invention, is positioned between the two inlet openings 106 of the air to be filtered and above them.

At the second vertical portion of the distributor 103, the casing 2 comprises a recess 114, having an upturned U-shape, which inferiorly connects with the housing seatings 4 of the filter cartridge 6.

Figure 1:
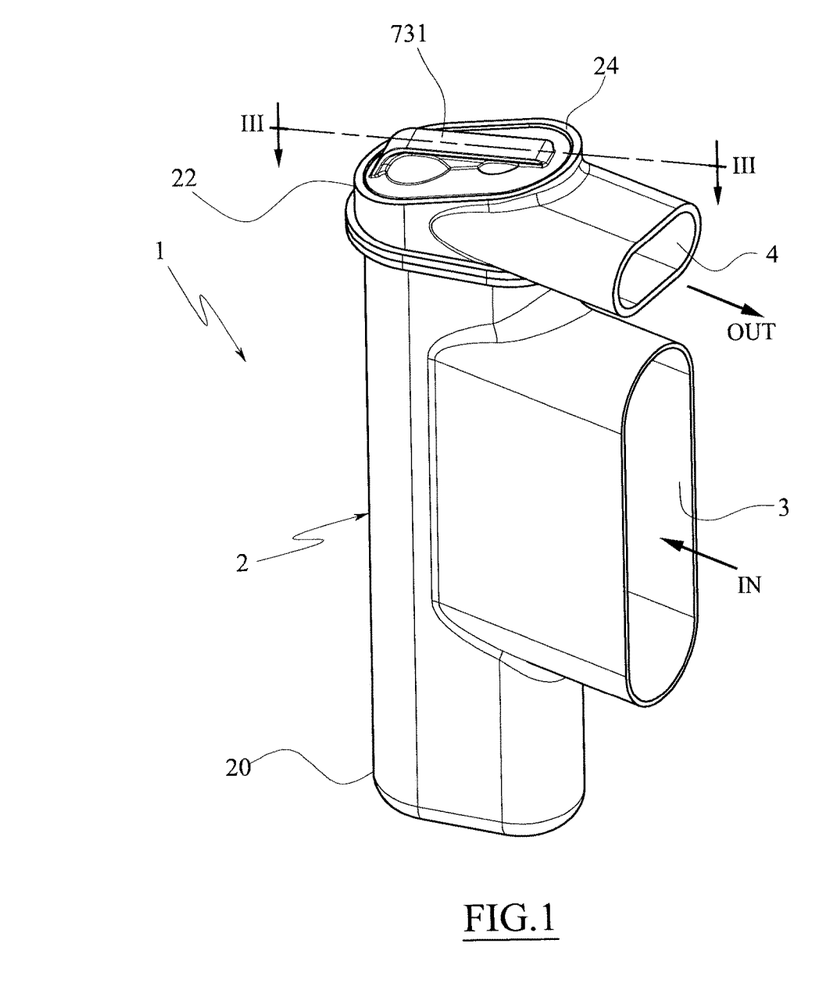
FIG. 1 is a perspective view of a filter group according to an embodiment of the invention.
Figure 2:
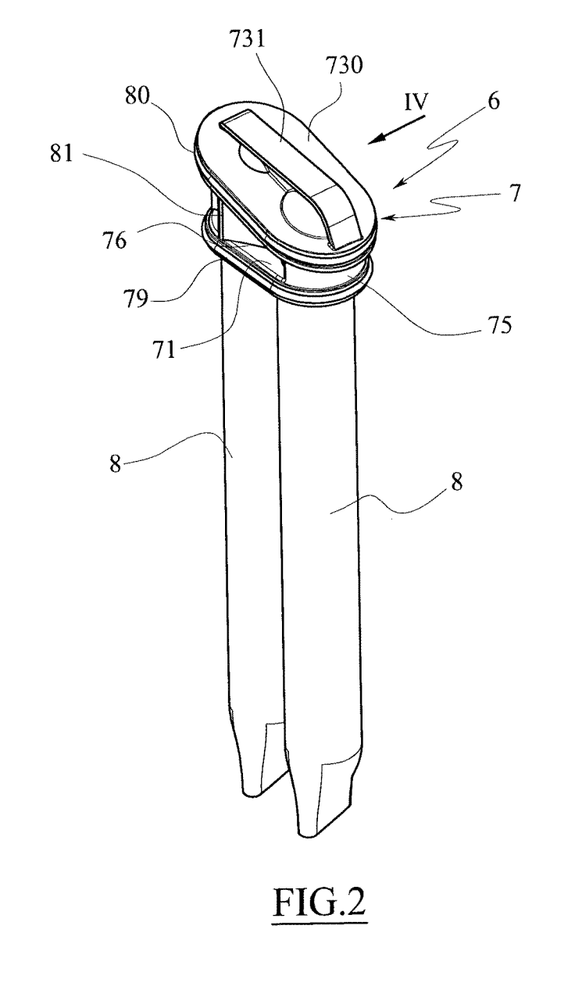
FIG. 2 is a perspective view of a filter cartridge according to an embodiment of the invention.
Figure 3:
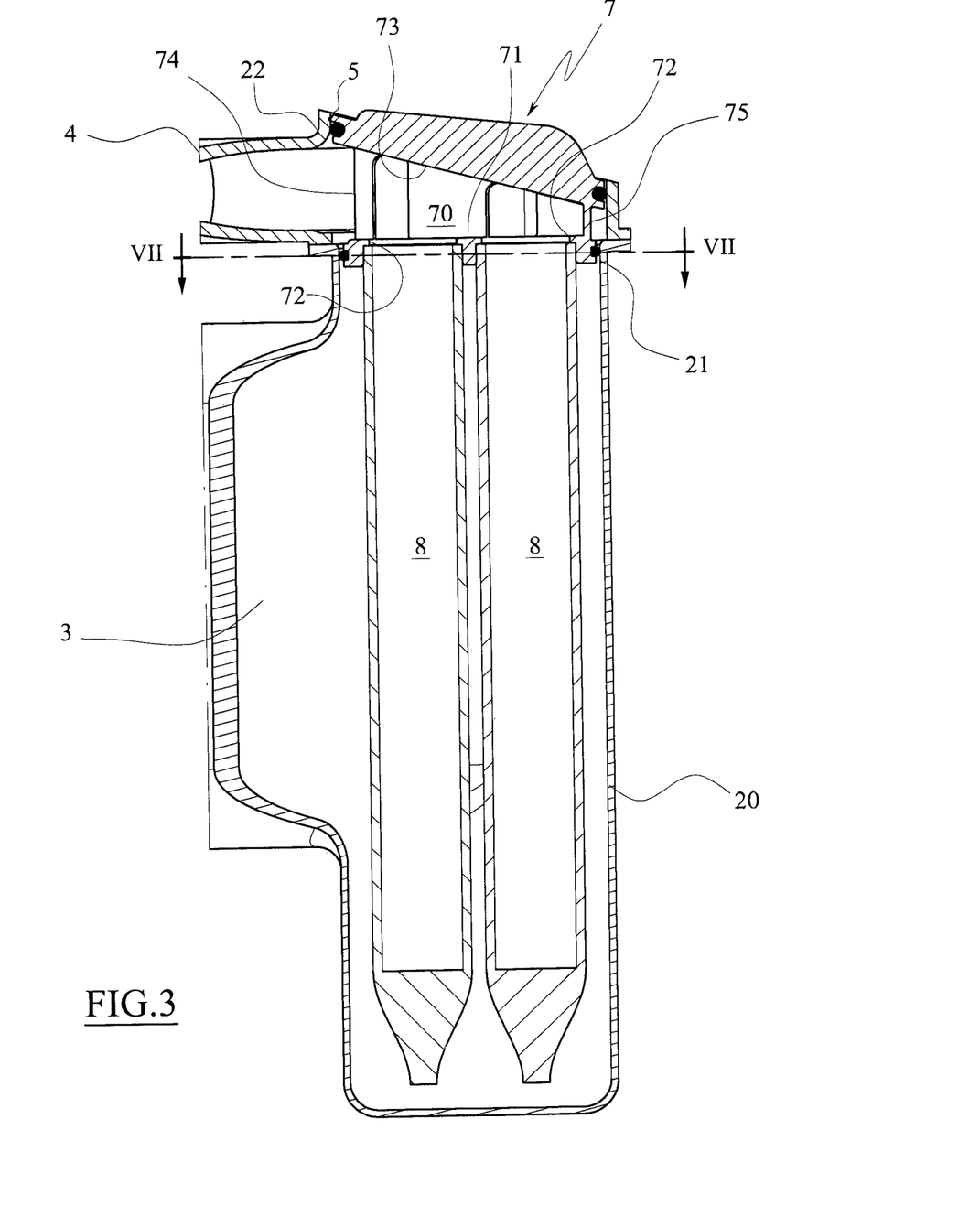
FIG. 3 shows section of FIG. 1.
Figure 4:
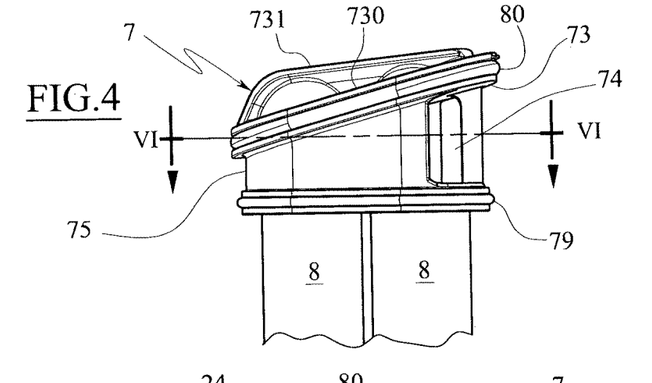
FIG. 4 shows a portion of the view from IV of FIG. 2.
Figure 5:
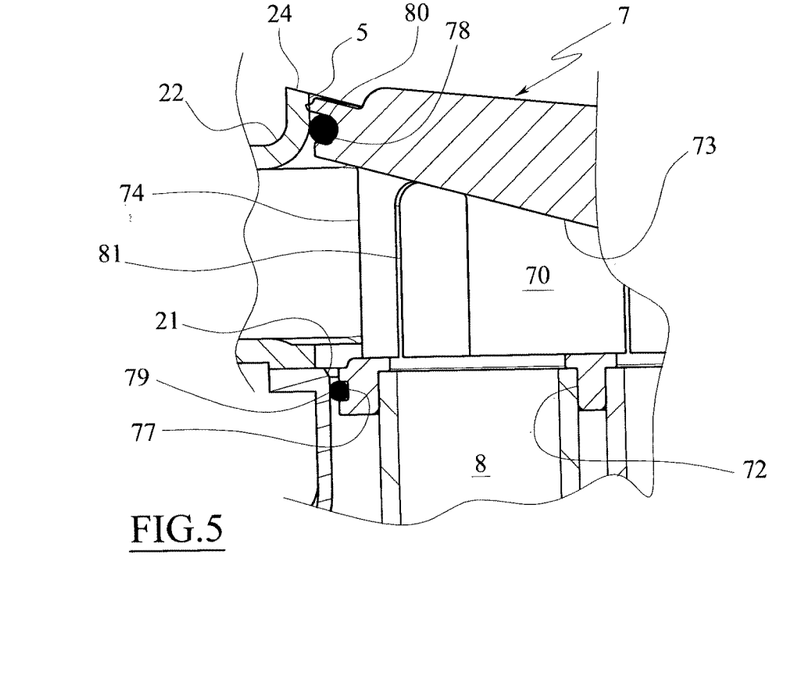
FIG. 5 illustrates a larger-scale view of a portion of FIG. 3.
Figure 6:
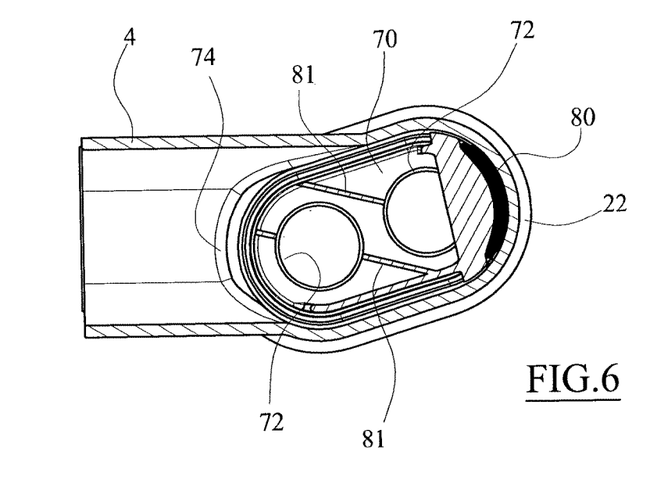
FIG. 6 shows section VI-VI of FIG. 4.
Figure 7:
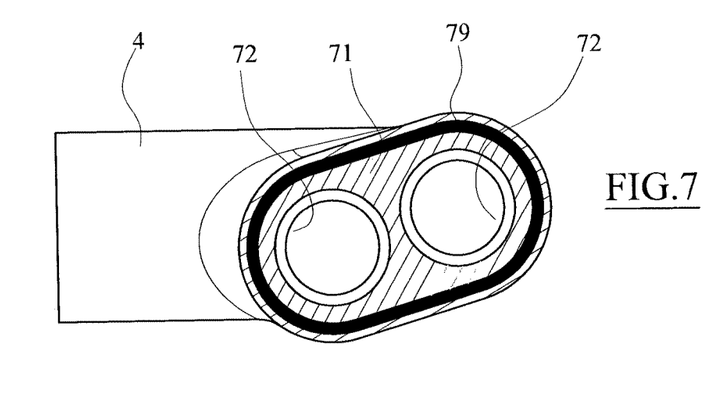
FIG. 7 shows section VII-VII of FIG. 3.
Figure 8:
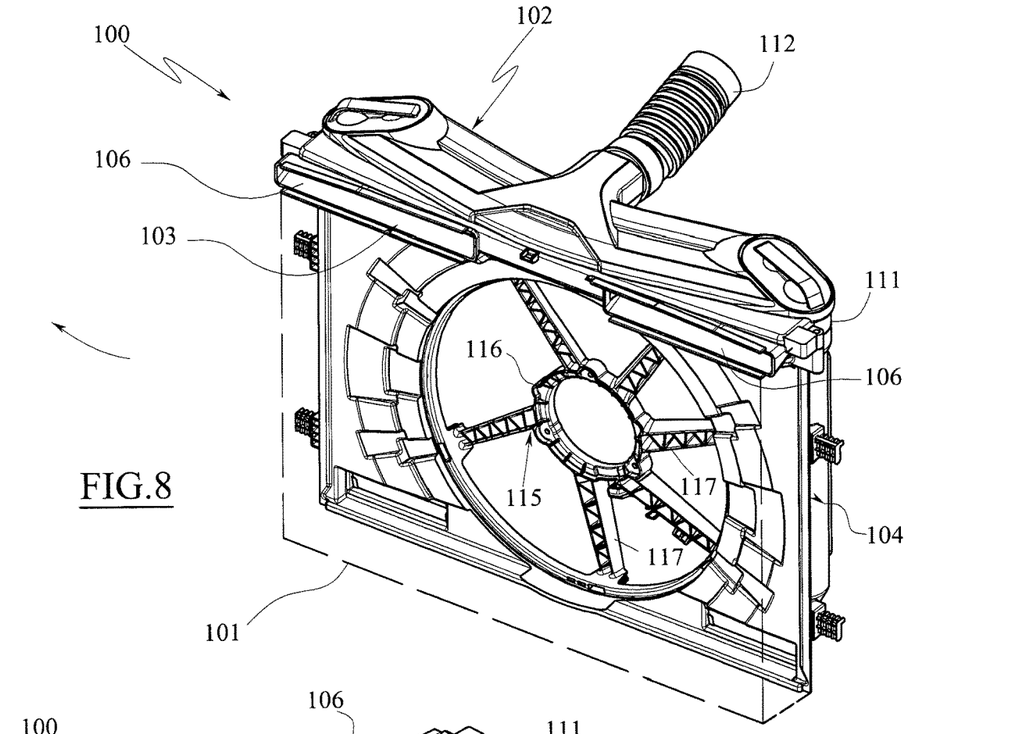
FIG. 8 is a perspective view from the front of a filter group according to an embodiment of the invention.
Figure 9:
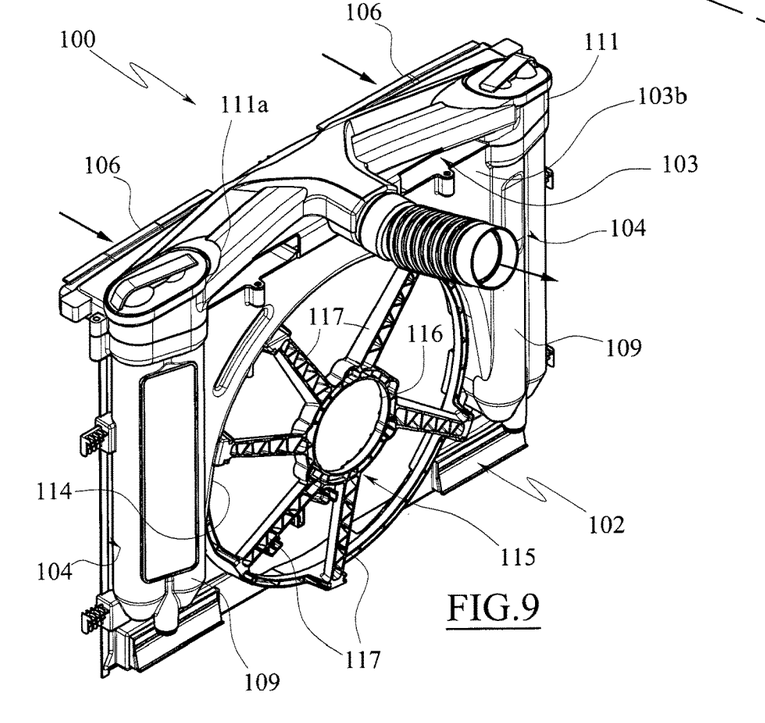
FIG. 9 is a perspective view from behind of a filter group according to an embodiment of the invention.

The recess 114 is provided with support means 115 of a cooling fan (not illustrated) of the radiator. The support means 115 comprise a perforated annular shank 116, connected to the casing 2 through a plurality of rods 117 (FIG. 8).

In the functioning of this embodiment of the invention, the air to be filtered enters internally of the distributor 103, through the passage openings 106, and flows through the first portion 103a of the distributor then to enter the second portion 103b thereof. In crossing the second portion 103b of the distributor the air is deviated by the walls 107 so as to separate any particles of water present in the flow of air to be filtered. The air flow crosses the filter walls 8 from outside towards inside, and flows towards the outlet conduit 112 of the filtered air, passing through the chambers 70 and the outlet manifold 105.

Figure 13:
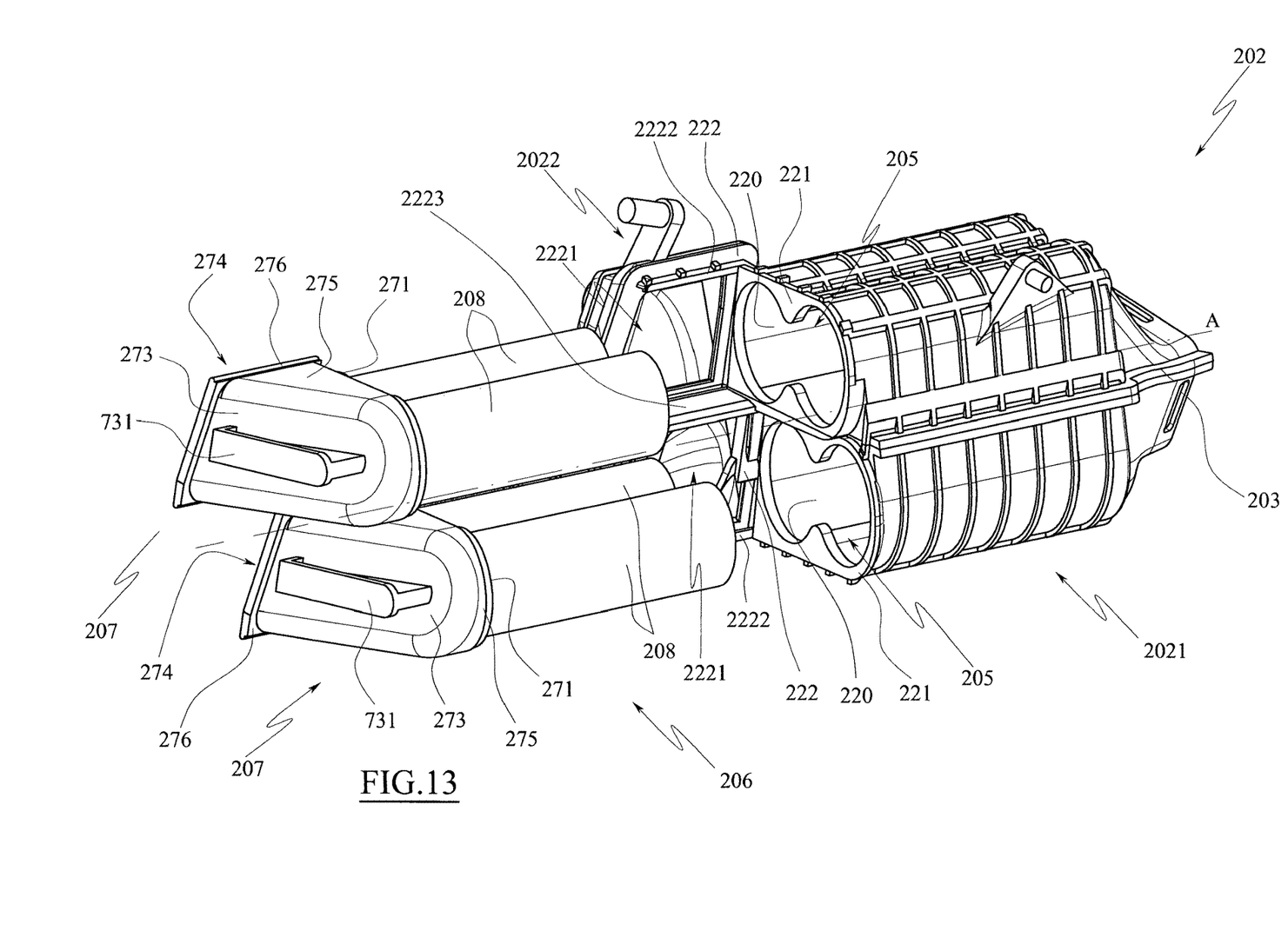
FIG. 13 is a perspective view of a filter group according to an embodiment of the invention.
Figure 14:
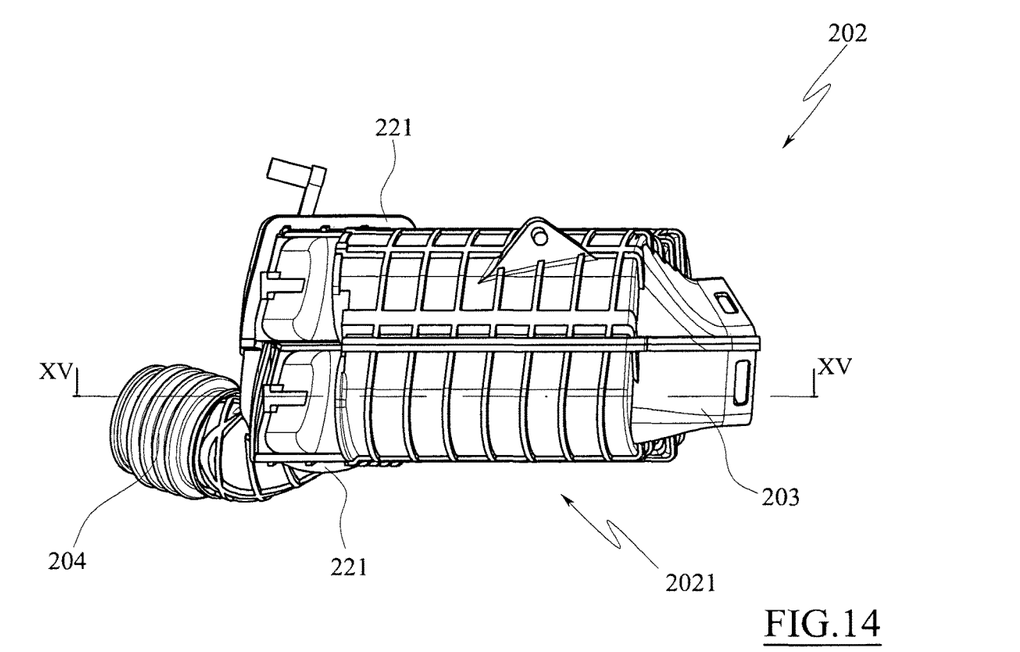
FIG. 14 is a view from above of the filter of FIG. 13.
Figure 15:
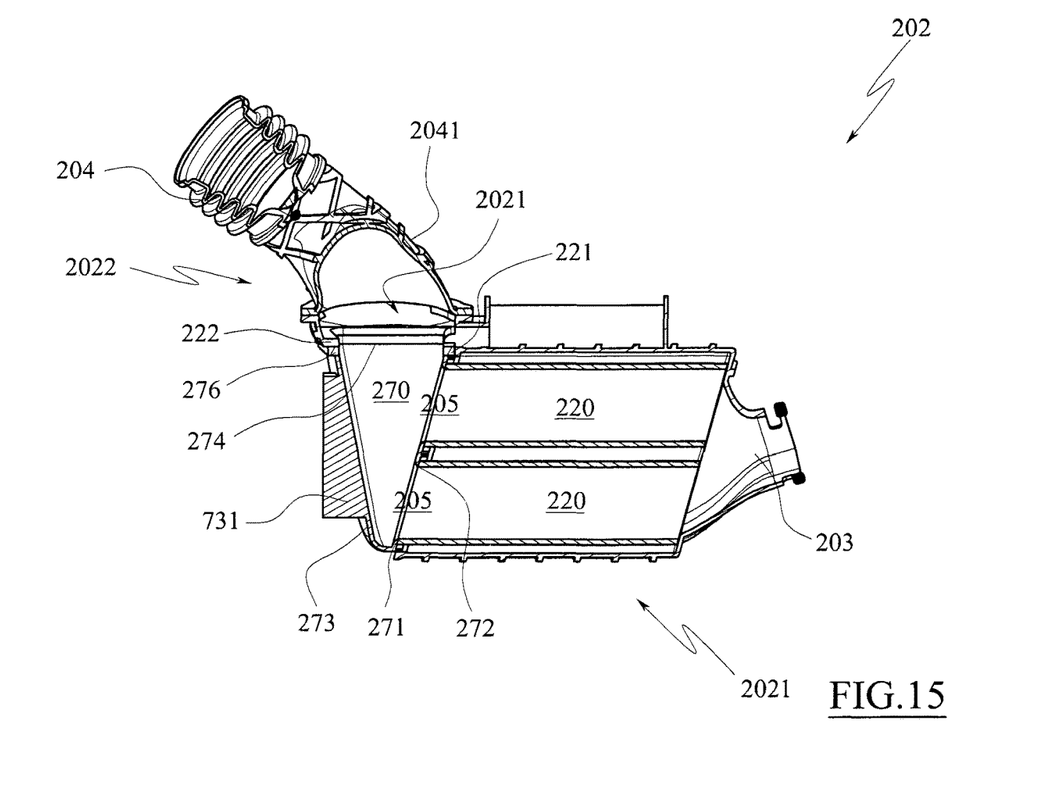
FIG. 15 shows section XV-XV of FIG. 14.

A third embodiment is illustrated in figures from 13 to 15, in which an external casing 202 is provided with a first portion 2021, which has a substantially prismatic and compact shape and extends along a longitudinal axis A.

At an end of the first portion, the external casing 202 has an inlet conduit 203.

At the opposite end, the external casing has two flanges 221 both lying in a perpendicular plane to the longitudinal axis A, each of which comprises an opening 205, having for example a bilobate profile.

Access to two identical seatings 220 is afforded through the openings 205, which seatings 220 are fashioned internally of the first portion 2021 and have longitudinal axes that are substantially parallel to one another and substantially parallel to the longitudinal axis A of the external casing 202.

Each of the seatings 220 is able to house a filter cartridge 206 which is axially inserted internally of the first portion 2021 of the external casing 202 through the relative opening 205.

At the openings 205, the external casing 202 further comprises a second portion 2022 that provides two further flanges 222 lying in a parallel plane to the longitudinal axis A.

Each of the flanges 222 of the second portion 2022 is located flanked and protrudes substantially projectingly with respect to a respective flange 221 of the first portion 2021, with which it defines a right-angled dihedron in which the corresponding opening 205 opens.

Each flange 222 of the second portion 2022 further comprises a window 2221 which is placed in fluid communication with an outlet conduit 204 made in the second portion of the external casing, via a manifold 2041 which embraces the external perimeter of the flanges 222.

Each flange 222 of the second portion 2022 is further provided with a pair of guides 2222 which extend parallel to the longitudinal axis A and which are located by sides of the relative window 2221.

In the specific example, the guides 2222 located between the two windows 2221 are made in a single wall 2223 which separates the two flanges 222 and rises from the first portion 2021 of the external casing 202 in the space comprised between the two openings 205.

Further, this third embodiment comprises a pair of filter cartridges 206, each of which is provided with a support body 207 and a filter wall 208 fixed to the support body 207.

The support body 207 comprises a chamber 270 delimited by a base flange 271, an upper wall 273, opposite the base flange 271, and a vertical perimeter wall 275 which laterally delimits the chamber 270.

The base flange 271 is provided with two shanks 272, at each of which the respective filter wall 208 is fixed.

The support body 207 further comprises a passage opening 274 afforded in the portion of vertical wall 275 facing the window 2221, the passage opening 274 being in fluid communication with the outlet conduit 204 of the filtered air. The upper wall 273 is inclined with respect to the base flange 271, so that the chamber 270 exhibits growing sections in a direction towards the passage opening 274 of the filtered air. Further, on an external portion thereof, it exhibits a grasping handle 731 which enables easy inserting and extracting of the filter cartridge 206 to and from the casing 202.

Further, the support body 270 comprises a flange 276, lying on a parallel plane to the longitudinal axis A and located at the passage opening 274.

The body 207 is sealedly inserted in the respective opening 205 by sliding the flange 276 into the corresponding guide 2222 up to bringing the base flange 271 into abutment against the respective flange 221 of the first portion 2021 of the external casing 202.

In this way the support body 207 occludes the opening 205 and places it in communication with the passage opening 274 and places the passage opening 274 in communication with the window 2221; in this way the support body 207 places the inlet conduit 203 in fluid communication with the outlet conduit 204.

The invention as it is conceived is susceptible to numerous modifications and variants, all falling within the scope of the inventive concept.

Further, all the details can be replaced by other technically-equivalent elements.

In practice, the materials used, as well as the contingent shapes and dimensions, can be any according to requirements, without forsaking the scope of protection of the following claims.

The invention claimed is:

1. A filter group (1) of air in supply to an internal combustion engine of motor vehicles, comprising
   an external casing (2) comprising: a beaker portion (20) and a cover (21), an inlet conduit (3) for air to be filtered, an outlet conduit (4) of filtered air and at least an opening (5), and,
   a filter cartridge (6) comprising a support body (7) and a filter wall (8) fixed to the support body (7),
   wherein the support body (7) comprises a base (71), an upper wall (73) opposite the base (71) and a chamber (70) delimited by the base (71) and the upper wall (73), the base (71) being provided with at least a perforated shank (72) to which the filter wall (8) is fixed, a passage opening (74) of the filtered air being defined between the base (71) and the upper wall (73), and
   wherein the filter cartridge (6) is axially inserted internally of the casing (2) through the opening (5), so that the opening (5) is occluded by the support body (7) of the filter cartridge (6) and the passage opening (74) is in fluid communication with the air outlet conduit.

2. The filter group of claim 1, wherein the upper wall (73) is inclined with respect to the base (71) so that the chamber (70) exhibits enlarging sections in a direction towards the passage opening (74) of the filtered air.

3. The filter group of claim 1, wherein the chamber (70) exhibits at least a perimeter vertical wall (75).

4. The filter group of claim 1, further comprising fins (81) located in the chamber (70) between the base (71) and the upper wall (73), said fins (81) being configured such as to direct the air towards the passage opening (74).

5. The filter group of claim 1, wherein the base (71) and the upper wall (73) exhibit a respective housing seating (77,78) of an annular seal gasket (79,80).

6. The filter group of claim 1, wherein said upper wall (73) comprises a grasping handle (731).

7. The filter group of claim 1, wherein the opening (5) is fashioned on the cover (21).

8. The filter group of claim 1, wherein the inlet conduit (3) is fashioned on the beaker body (20) and the outlet conduit (4) is fashioned on the cover (21).

9. The filter group of claim 1, wherein the external casing (102) is provided with a distributor (103) for conveying the air to be filtered towards at least a housing seating (104) of the filter cartridge (6), and a manifold (105) able to convey the filtered air towards an outlet conduit (112), wherein the distributor (103) comprises an air inlet opening (106) located above an upper surface of a radiator (101) to which the external casing (2) is associated.

10. The filter group of claim 9, wherein the distributor (103) is step-conformed and comprises a first portion (103a), provided with the air inlet mouth (106), which develops in a direction of a horizontal axis (A), and a second portion (103b), perpendicular to the first portion destined to be located at a vertical surface of the radiator (101).

11. The filter group of claim 10, wherein the casing (102) comprises at least an upper opening (113), located at an upper surface thereof and configured such as to receive a filter cartridge (6).

12. The filter group of claim 9, wherein the manifold (105) is located above the air inlet opening (106).

13. The filter group of claim 9, wherein the distributor (103) comprises two air inlet openings (106) symmetrical with respect to a vertical plane of symmetry which contains a vertical axis of symmetry (B).

14. The filter group of claim 13, further comprising two housing seatings of a respective filter cartridge, which are symmetrical with respect to a vertical plane of symmetry, which contains the vertical axis of symmetry (B) of the casing (102), and is perpendicular to the radiator (101), and are located respectively at a vertical end of the casing (102).

15. The filter group of claim 9, wherein the casing (102) comprises a support (115) of a cooling fan of the radiator (101).

16. The group of claim 10, wherein the second portion (103b) of the distributor (103) comprises deviating walls (107) of the air to be filtered.

17. A filter group (1) of air in supply to an internal combustion engine of motor vehicles, comprising:
   an external casing (2) provided with an inlet conduit (3) for air to be filtered, an outlet conduit (4) of filtered air and at least an opening (5), and
   a filter cartridge (6) comprising a support body (7) and a filter wall (8) fixed to the support body (7),
   wherein the support body (7) comprises a base (71), an upper wall (73) opposite the base (71) and a chamber (70) delimited by the base (71) and the upper wall (73), the base (71) being provided with at least a perforated shank (72) to which the filter wall (8) is fixed, a passage opening (74) of the filtered air being defined between the base (71) and the upper wall (73), and
   wherein the filter cartridge (6) is axially inserted internally of the casing (2) through the opening (5), so that the opening (5) is occluded by the support body (7) of the filter cartridge (6), the filter wall (8) is housed inside the external casing (2), the upper wall (73) of the support body (7) is at least partially exposed to the exterior of the external casing (2) and the passage opening (74) is in fluid communication with the air outlet conduit.

\* \* \* \* \*